US010567707B2

(12) United States Patent
Ma

(10) Patent No.: US 10,567,707 B2
(45) Date of Patent: Feb. 18, 2020

(54) METHODS AND SYSTEMS FOR MANAGEMENT OF CONTINUOUS GROUP PRESENCE USING VIDEO CONFERENCING

(71) Applicant: Blue Jeans Network, Inc., Mountain View, CA (US)

(72) Inventor: Luke Ma, San Jose, CA (US)

(73) Assignee: Blue Jeans Network, Inc., San Jose, CA (US)

( * ) Notice: Subject to any disclaimer, the term of this patent is extended or adjusted under 35 U.S.C. 154(b) by 0 days.

(21) Appl. No.: 15/783,464

(22) Filed: Oct. 13, 2017

(65) Prior Publication Data

US 2019/0116338 A1 Apr. 18, 2019

(51) Int. Cl.
| | |
|---|---|
| *H04N 7/14* | (2006.01) |
| *G10L 25/78* | (2013.01) |
| *H04N 7/15* | (2006.01) |
| *H04N 21/439* | (2011.01) |
| *H04N 21/44* | (2011.01) |
| *H04N 21/4788* | (2011.01) |

(52) U.S. Cl.
CPC ............. *H04N 7/147* (2013.01); *G10L 25/78* (2013.01); *H04N 7/152* (2013.01); *H04N 21/4394* (2013.01); *H04N 21/44* (2013.01); *H04N 21/4788* (2013.01)

(58) Field of Classification Search
USPC ...................................................... 348/14.12
See application file for complete search history.

(56) References Cited

U.S. PATENT DOCUMENTS

| | | | |
|---|---|---|---|
| 7,007,098 B1 * | 2/2006 | Smyth ............... | H04L 29/06027 348/E7.084 |
| 2011/0063440 A1 | 3/2011 | Neustaedter et al. | |
| 2011/0279631 A1 * | 11/2011 | Ranganath ............ | H04M 3/565 348/14.08 |
| 2011/0279632 A1 * | 11/2011 | Kulkarni ................ | H04N 7/147 348/14.09 |
| 2013/0169742 A1 | 7/2013 | Wu et al. | |
| 2014/0354761 A1 * | 12/2014 | Graff ...................... | H04N 7/152 348/14.04 |
| 2016/0112675 A1 * | 4/2016 | Morita .................... | H04L 65/80 348/14.09 |

FOREIGN PATENT DOCUMENTS

WO WO 2014078948 A1 * 5/2014 ......... H04L 43/0817

OTHER PUBLICATIONS

International Search Report and Written Opinion dated Jan. 30, 2019, from the ISA, European Patent Office, for International Application No. PCT/US2018/055491 (filed Oct. 11, 2019), 15 pages.

* cited by examiner

*Primary Examiner* — Amal S Zenati

(74) *Attorney, Agent, or Firm* — Ascenda Law Group, PC

(57) ABSTRACT

Continuous group presence is managed during a video conference by, for example, connecting a first video conferencing endpoint to a video conference session having at least one secondary video conferencing endpoint, receiving a trigger condition at the first video conference endpoint, determining if the trigger condition exceeds a predetermined threshold, and transmitting through the video conference session, a trigger notification, wherein the trigger notification enables an audio connection from the first conferencing endpoint to at least one secondary video conferencing endpoint.

14 Claims, 10 Drawing Sheets

METHODS AND SYSTEMS FOR MANAGEMENT OF CONTINUOUS GROUP PRESENCE USING VIDEO CONFERENCING

FIELD OF THE INVENTION

One embodiment of the present invention relates to methods and systems for management of continuous group presence using video conferencing.

BACKGROUND

Work teams with members in physically disparate locations are able to collaborate with one another using video conferencing, but often miss casual interactions that are more frequent when team members are fully co-located. Existing video conferencing solutions that provide simulated co-location experiences exist, but assume user-level management of media states. While video being sent and received continuously using such solutions may be acceptable, unmanaged audio, in particular, can introduce significant workplace disruptions.

SUMMARY

Recognizing the limitations inherent in existing solutions, the present inventors have devised an automated system for managing video conferencing sessions that more seamlessly replicates the experience of being co-located in a workplace or other environment through intelligent and automated management of audio and/or video send and receive states. To that end, various endpoints are allowed to connect to a continuous presence videoconference, thereby establishing an active videoconference session. This session can be setup to be maintained for an indefinite period of time to provide a "portal" that links physically separate locations together. In a default state, video from each endpoint connected to the session remains active, but audio is muted unless active participants are present at an endpoint. This ensures that workplace disruptions are minimized when no active participants are engaged in endpoint-to-endpoint conversations or activities.

Embodiments are described for management of continuous group presence using video conferencing. In some embodiments, a first video conferencing endpoint connects, by a processor, to a video conference session having at least one secondary video conferencing endpoint. The first video conferencing endpoint receives, by the processor, a trigger condition at the first video conference endpoint. The first video conferencing endpoint determines, by the processor, if the trigger condition exceeds a predetermined threshold. The first video conferencing endpoint transmits, by the processor, through the video conference session, a trigger notification, wherein the trigger notification enables an audio connection from the first conferencing endpoint to at least one secondary video conferencing endpoint.

DETAILED DESCRIPTION

Figure 1:
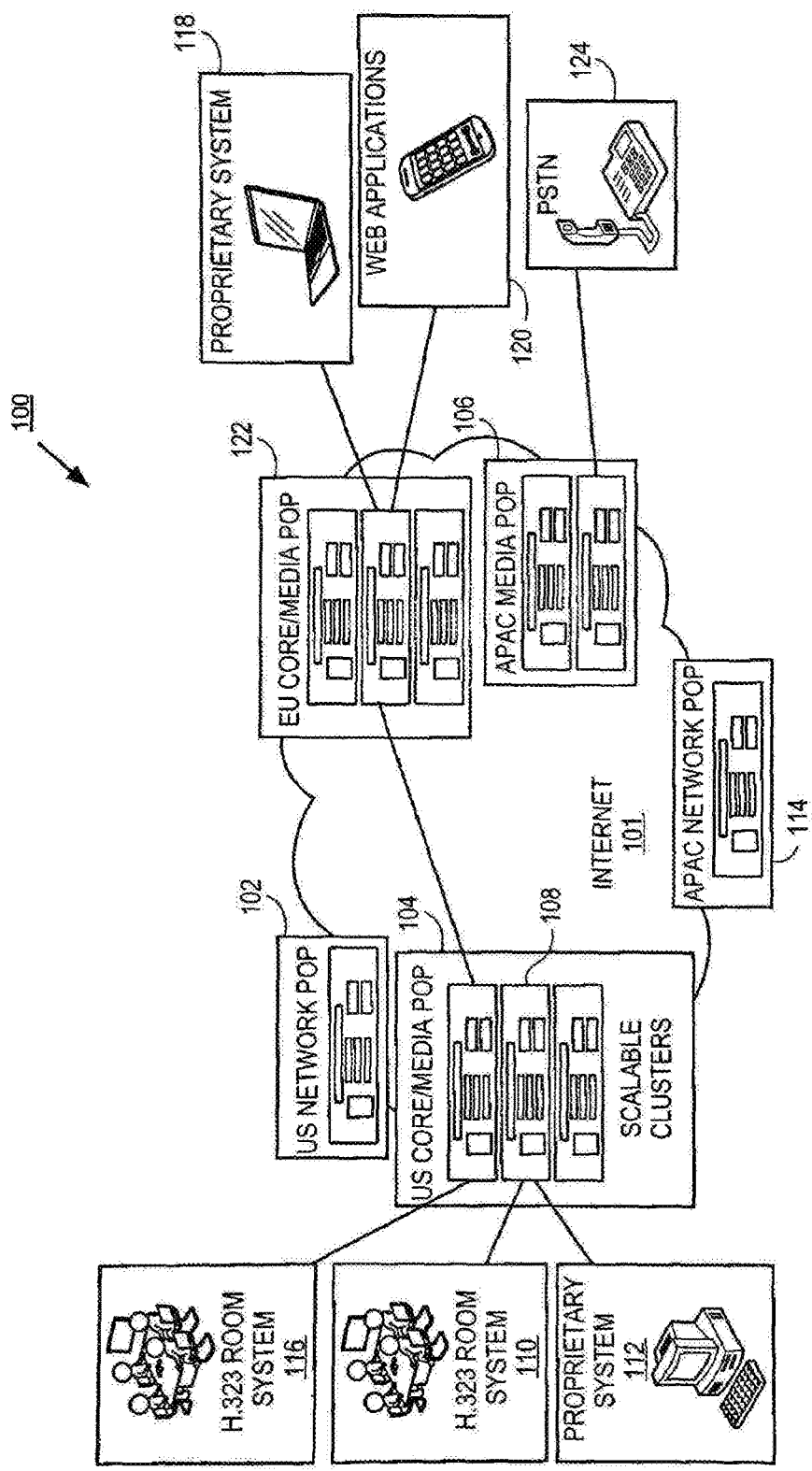
FIG. 1 depicts an exemplary video conferencing system in accordance with some embodiments of the invention.

In order to provide a constant presence videoconference session for two or more locations, a videoconference endpoint connects to a videoconferencing system along with other respective endpoints to create a single active videoconference session. This single session can be setup to be maintained for an indefinite period of time to provide for a "portal" type of system to link physically separate locations together continuously. In a default state, a video feed from each endpoint connected to the session is sent to each of the respective connected endpoints, and audio is muted until the system detects a trigger condition that signals the presence of active participants who wish to use the portal videoconference to collaborate with other portal users at at least one of the other connected endpoints.

Embodiments of apparatuses, computer systems, computer readable mediums, and methods for a video conference system involving managing continuous group presence videoconferences are described. In some embodiments, a processor connects a first video conferencing endpoint to a video conference session having at least one secondary video conferencing endpoint. The processor receives a trigger condition at the first video conference endpoint. The processor determines if the trigger condition exceeds a predetermined threshold. The processor transmits through the video conference session, a trigger notification, wherein the trigger notification enables an audio connection from the first conferencing endpoint to at least one secondary video conferencing endpoint.

The video conference system may support a variety of video conferencing feeds of audio, video, audio and video, and/or other media data streams from video conferencing participant endpoints to present a video conference. Endpoints may be any type of device, including, but not limited to: laptops, computers, smartphones, tablets, phones, audio and video conferencing system devices, and/or any other device capable of sending and receiving data streams over a network. Participants may use proprietary or standards-based communication protocols with their devices, and the video conference system may enable a multi-party and/or point-to-point (e.g., between two endpoints) video conference session among the plurality of participant endpoints to provide for continuous group presence for teams working in physically disparate locations.

These interactions encompass the control of a video conference session, its configuration, the visual layout of the data streams from the conference participants, customization of the user interface, and adaptation of a video conference to integrate with and present data streams from different client applications (e.g., chat, whiteboards, Microsoft Skype, etc.). For a non-limiting example, one such use of the video conference system is to facilitate conferences between two disparate endpoints such as a client application for a proprietary system from a communication service provider and an application for a standards-based H.323 endpoint.

FIG. 1 depicts an exemplary video conferencing system 100, in accordance with some embodiments of the invention. The video conferencing system 100 may include one or more points of presence (POPs—e.g., POPs 102, 104, 106, and 114). The POPs may be respectively organized to comprise scalable clusters of nodes, such as media processing nodes 210, as described in connection with FIG. 2 below. Media processing nodes are used to process and compose video conference feeds from various endpoints (e.g., 116, 10, 112, 118, 120, and 124). In certain embodiments, media processing nodes are multipoint control units (MCUs). In certain embodiments, the media processing nodes associated with a POP may work together (and, in some embodiments, work with other POP components) to collectively function as a MCU. In some embodiments, a clustered design makes use of network layer multicast and a multi-bit-rate stream distribution scheme to allow scaling. In certain embodiments, media processing nodes may be implemented with off-the-shelf components, such as Linux/x86 Central Processing Units (CPUs) and PC Graphics Processing Units (GPUs) instead of custom hardware. MCUs based on clusters of media processing nodes can be deployed in a rack-and-stack cloud-computing style and hence achieve the a scalable and cost/performance-efficient approach to support a video conferencing service. Video conferencing system 100 may be used for media stream distribution processing that may be achieved locally on a Local Area Network (LAN) present in each POP and/or across multiple POPs on the Wide Area Network (WAN).

In some embodiments, video conferencing system 100 may be implemented with clusters of x86 servers (e.g., server 108) both locally on a LAN as well as across geographies serving as the media processing nodes for the MCUs to achieve near unlimited scaling. Endpoints may be, for example, room systems running H.323 (as shown with 110), PCs running H.323, PCs or mobile devices running Skype or Microsoft Lync (as shown with 112).

By way of a non-limiting example, video conferencing system 100 has the media processing node MCUs distributed around the globe in POPs (e.g., United States (US) Network POP 102, US Core Media POP 104, Asia Pacific (APAC) Media POP 106, APAC Network POP 114, and European Union (EU) Core Media POP 122) at data centers (e.g., third party data centers) to process video conference feeds coming from video conference endpoints having different communication protocols and/or using different client applications from communication service providers.

In some embodiments, the video conferencing system 100 may have multiple other globally distributed private networks to connect to it, including, but not limited to, deployments of video conferencing services such as Microsoft Lync that require federation (i.e. cooperation among multiple organizational entities) at edge nodes and translation and decoding of several communication and transport protocols.

Figure 2:
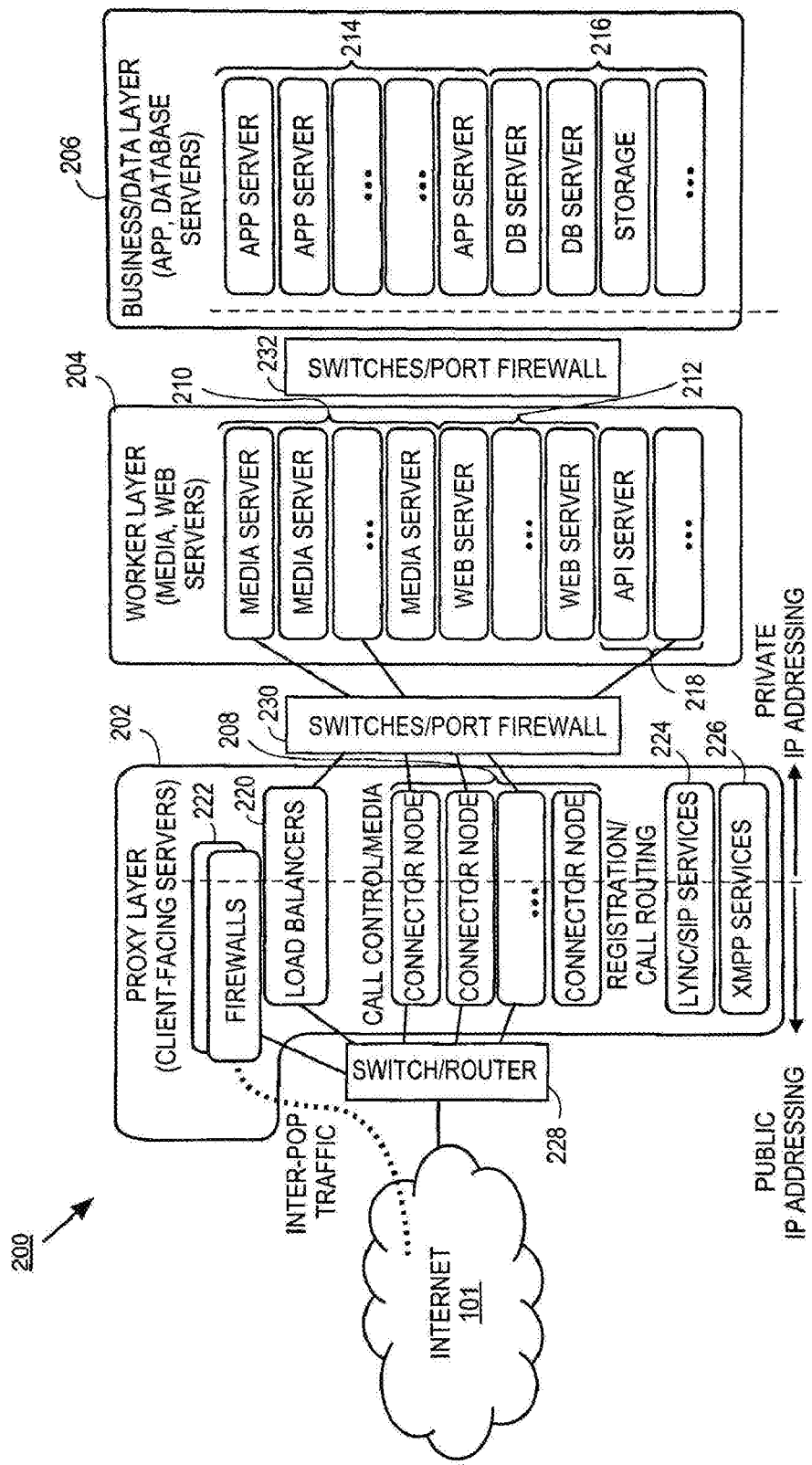
FIG. 2 depicts an exemplary POP media processing node architecture in accordance with some embodiments of the invention.

FIG. 2 depicts an exemplary POP media processing node architecture 200 (e.g., architecture for POPs 102, 104, 106, 114, and 122) accessible over a network 101 with a Proxy Layer 202, a Worker Layer 204, and a Business/Data Layer 206. Some of the components/elements of the POP 200 include but are not limited to, the following: load balancers 220, firewalls 222, media processing nodes (media servers) collectively 210 for processing data streams (e.g., transcoding, compositing, mixing and/or echo cancellation among H.26x, G.7xx, and SILK), protocol connector nodes collectively 208 for handling call and/or media processing control for endpoints of video conference (e.g., for H.323, Skype, SIP, XMPP, and NAT traversal), servers for handling particular communication services or protocols (e.g., LYNC, SIP services 224, and XMPP services 226), web servers collectively 212, application programming interface (API) servers 218, data storage collectively 216 (e.g., database (DB) servers and other storage), and applications servers collectively 214 for supporting web applications (e.g., for providing functionality to the user, such as conference control, screen and presentation sharing, chat, etc.). The components may be distributed across the nodes and/or POPs of the video conferencing system 100 for enabling real-time or nearly real-time communication. Components may be connected on a network and can communicate over networks utilizing switches and routers as shown with 228, 230, and 232.

Some components, which include, but are not limited to, the following components: user/account management, billing system, NOC (Network operation center) systems for bootstrapping, monitoring, and node management may be run at one or more centralized but redundant management nodes in the Business/Data Layer 206. Other components, which include but are not limited to, common application framework and platform (e.g., Linux/x86 CPUs, GPUs, package management, clustering) can be run on both the distributed nodes and the centralized management nodes.

Each of the protocol connector nodes 208 in the Proxy Layer 202 may receive audio video data streams utilizing proprietary or standards based communication protocols and may translate the received data into a common protocol (e.g., Real Time Transport Protocol (RTP)). The received data in the common protocol may then be sent to media servers for transcoding and composition/mixing by media processing nodes 210 of the Worker Layer 204, with such operation of the media processing nodes 210 used to form composite data streams for the endpoints. Translating (when needed) may include receiving the data packets of a data stream communicated using a first communication protocol and retransmitting the received data packets using a second communication protocol.

In some embodiments, application server 214 (e.g., a user experience engine) renders multimedia content including but not limited to the composite audio/video stream to each of the participants to the video conference via one or more user interfaces.

Figure 3:
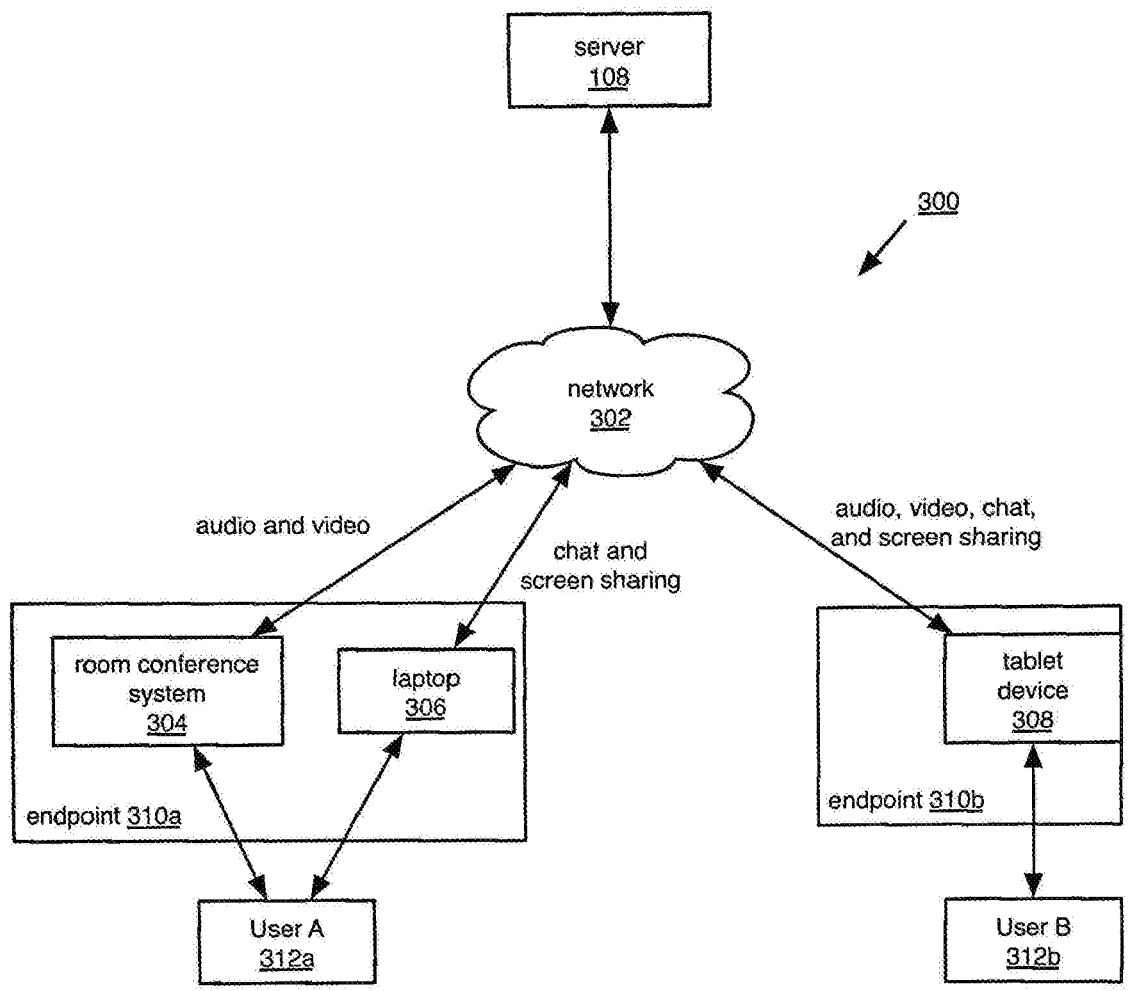
FIG. 3 depicts exemplary components of a video conferencing system in accordance with some embodiments of the invention.

FIG. 3 shows exemplary components of a video conferencing system 300, in which multiple devices may form a single video conference endpoint, each device with its own set of capabilities. A user can join a video conference call with (i) a room conference system that can be used for audio and video, (ii) a tablet device or laptop that can be used for screen sharing, and (iii) a smart phone that can be used for chat, all of these electronic devices forming a single video conference endpoint. In the embodiment shown in FIG. 3, room conference system 304 and laptop 306 are associated as a single endpoint 310a with User A (312a), and tablet device 308 forms a second endpoint 310b associated with User B (312b). In a video conference facilitated by a room conference system with limited capabilities (e.g., no chat possible), a mobile device (e.g., mobile phone, tablet computer, laptop computer, etc.) can be used to supplement the capabilities of the room conference system (e.g., provide chat).

Server 108 may support a set of capabilities, such as audio, video, chat, screen sharing and the like, for each user. A user can join a video conference with a first device that is capable of supporting audio/video and a second device that is better suited for content sharing and chat. Server 108 may associate a first user with both the first and second devices, and consequently can determine the communication modes (i.e., audio, video, content sharing and chat) that are associated with the first user. Server 108 may be a component of video conferencing system 100, such as a server of POP media processing node architecture 200. Network 302 may be a WAN, the internet, a telecommunications network, a LAN, or the like.

In certain embodiments, the user may identify himself/herself at the time of joining a video conference with a device, by pairing the device with another device already joined into the video conference. For instance, after a first user joins a video conference using a first device, server 108 may provide the first user with a short alphanumeric code that can be used to associate any further devices that join the video conference with the first user. That is, the first user can join a second device into the video conference by entering the short alphanumeric code on the second device; the second device may then provide the short alphanumeric code to server 108; and server 108 may then associate both the first and second devices with the first user.

In addition and/or alternatively, pairing may be heuristically determined by the server. For instance, server 108 may detect similar audio signals (e.g., similarity being measured based on the correlation between two signals) being received from a first device and a second device. As such correlation may indicate two devices being used by the same user, server 108 may then associate the first and second devices with the same user (and/or with the same video conference endpoint).

Figure 4:
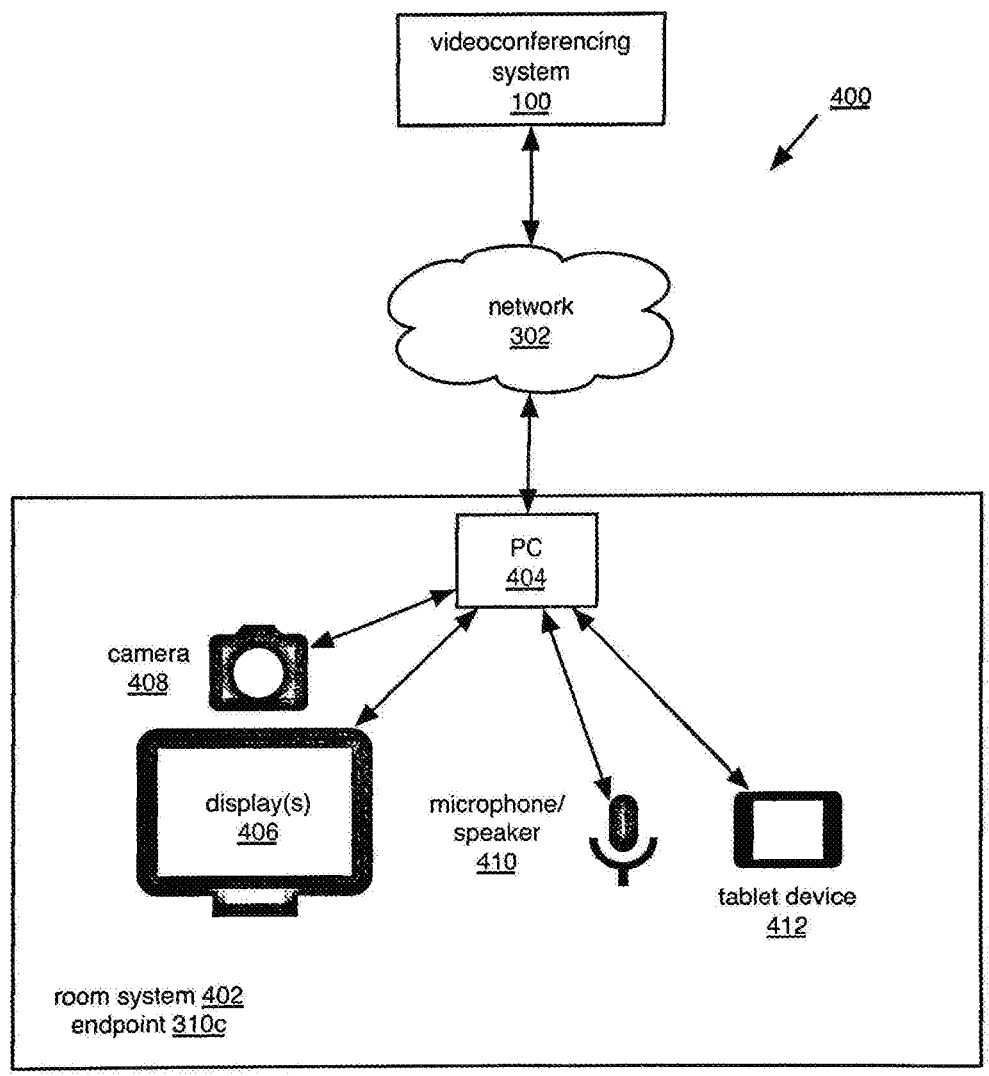
FIG. 4 depicts exemplary components of an exemplary room system endpoint in a video conferencing system in accordance with some embodiments of the invention.

FIG. 4 shows the components of an exemplary room system endpoint 310c in a video conferencing system 400. Room system 402, functioning as an endpoint 310c, may comprise a personal computer 404, one or more displays 406, a camera 408, a microphone and speaker 410, and a tablet device 412. Personal computer 404 may act as a hub for mediating data communications between some or all of the components of the room system endpoint 310c, and may be, for example, a small form-factor computer such as a Mac Mini or an Intel NUC (Next Unit of Computing) computer. Displays 406 may be a television, a monitor, or a projector and projector screen or white board. The microphone and speaker may be contained in a single device or multiple devices; in certain embodiments, the room system 402 may include multiple microphones and speakers. Tablet device 412 (alternatively, another mobile device such as a smartphone) may provide a user interface for controlling the video conferencing experience at room system 402.

Figure 5:
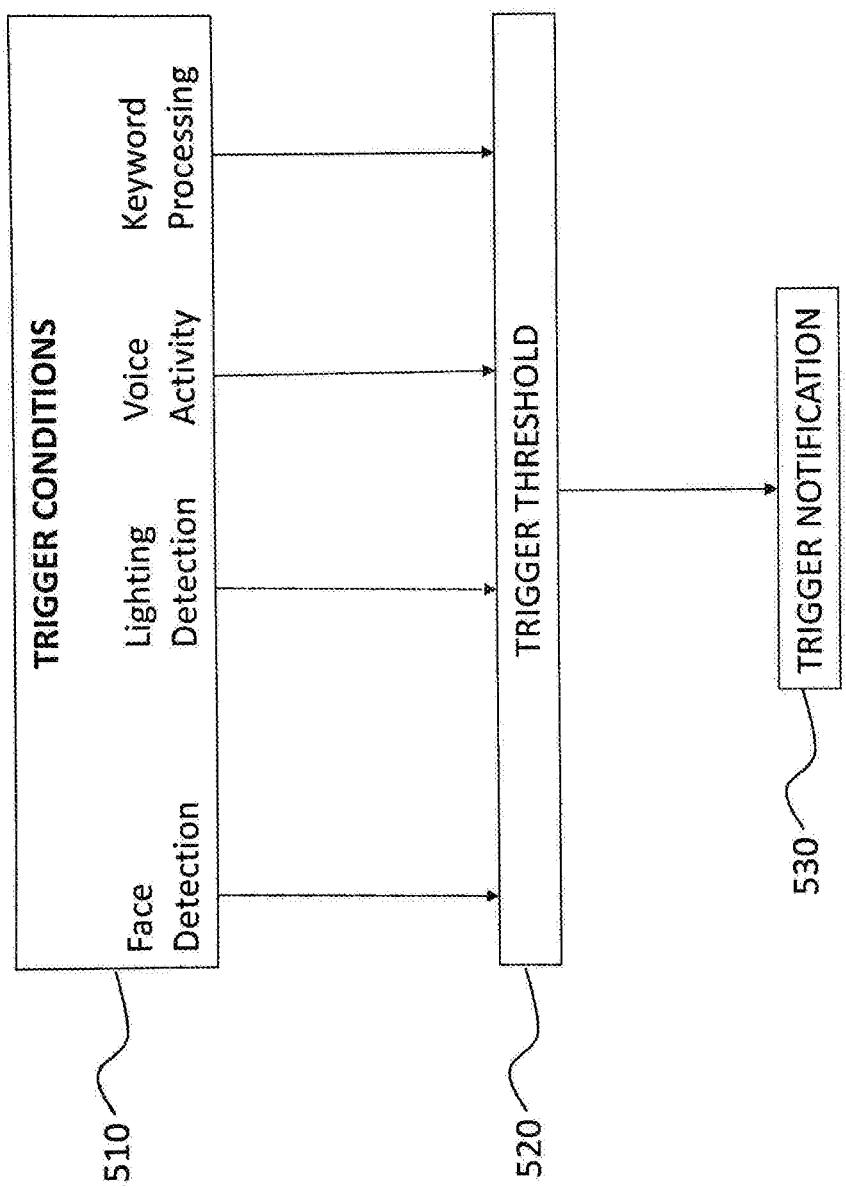
FIG. 5 depicts an exemplary trigger generation matrix in accordance with some embodiments of the invention.

FIG. 5 depicts an exemplary trigger generation matrix in accordance with some embodiments of the invention. Trigger conditions 510 are conditions which may be monitored by videoconferencing endpoint. Face detection of a user proximate to endpoint can generate a trigger condition 510. Lighting detection (i.e. turning lights on in a room) can be another trigger condition 510 which is monitored. Voice activity proximate to videoconference endpoint may be monitored as a trigger condition 510. Keyword processing of monitored communications from associated chat programs or listening for key phrases or keywords spoken can also be another set of respective trigger conditions 510. Further, facial recognition of a particular user proximate to an endpoint can also be a trigger condition. It can be understood that additional trigger conditions could be monitored by a videoconferencing endpoint, such as the number of users in a location and what direction a user is facing.

Each of the trigger conditions are monitored to determine if a respective trigger threshold 520 is reached or exceeded. For example, a threshold for brightness or other monitored condition may be established so that lights turning on in a hallway adjacent to the location of a videoconferencing endpoint would not satisfy trigger threshold 520, while lights turning on in the room of the videoconferencing endpoint would satisfy trigger threshold 520. Another example of trigger threshold 520 for facial recognition would be a determination of a recognized user for a videoconference system (e.g. employee vs guest determination) as resolved through reference to a database of images of permitted users. Another example of trigger threshold 520 is a determination that a user proximate to an endpoint looks toward a predetermined area (e.g., a camera lens) for a minimum period of time. If trigger threshold 520 is met or exceeded by one or more monitored trigger conditions 510, then trigger notification 530 is sent by the videoconferencing endpoint that detected the trigger condition through to the other connected endpoints (e.g., via one or more video conference POPs). Trigger notification 530 causes an audio link for the videoconferencing session to be enabled between endpoint as described below.

Figure 6A:
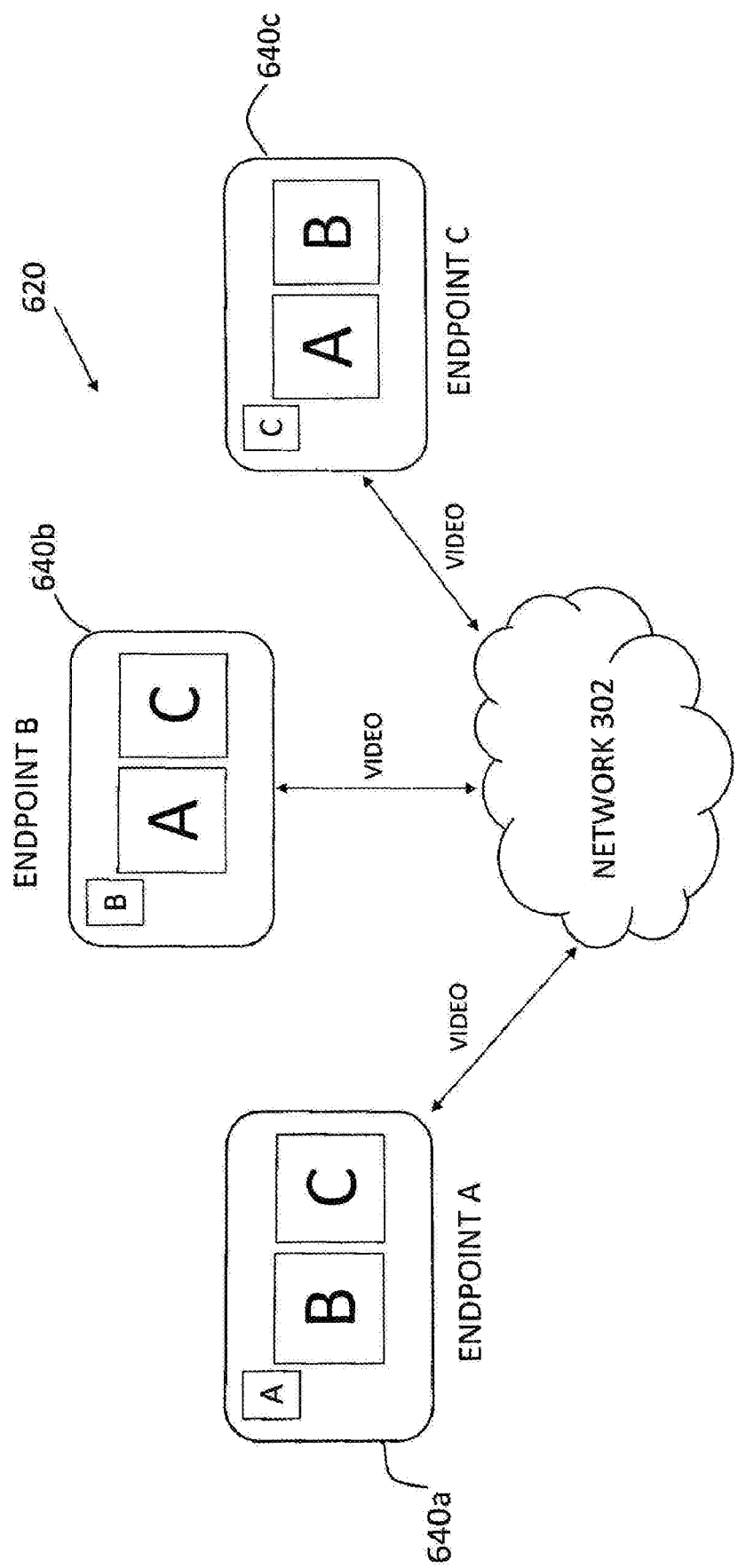
FIGS. 6A-6C depict an exemplary media flow for a video conferencing system in accordance with some embodiments of the invention.

FIG. 6A depicts an exemplary media flow for three Endpoints A-C connected in a continuous videoconference session 620 via network 302. Although not shown in this illustration, network 302 may include one or more POPs, as discussed above with reference to FIG. 1. The default state shown in FIG. 6A is exemplified by each of Endpoints A-C displaying a video feed from the other two respective endpoints with audio muted. In an exemplary embodiment, the default state broadcasts video at a low stream rate (e.g., a 2 Mb/s video stream instead of 10 Mb/s video stream) from each of Endpoints A-C to reduce the constant bandwidth requirements of the videoconference session 620. Also, Endpoint A shows an exemplary display 640a of a video feed received from Endpoints B and C, as well as a smaller video feed from its own location for feedback. With no triggers, the video feed of Endpoints B and C 640b, 640c are displayed at approximately the same size.

Figure 6B:
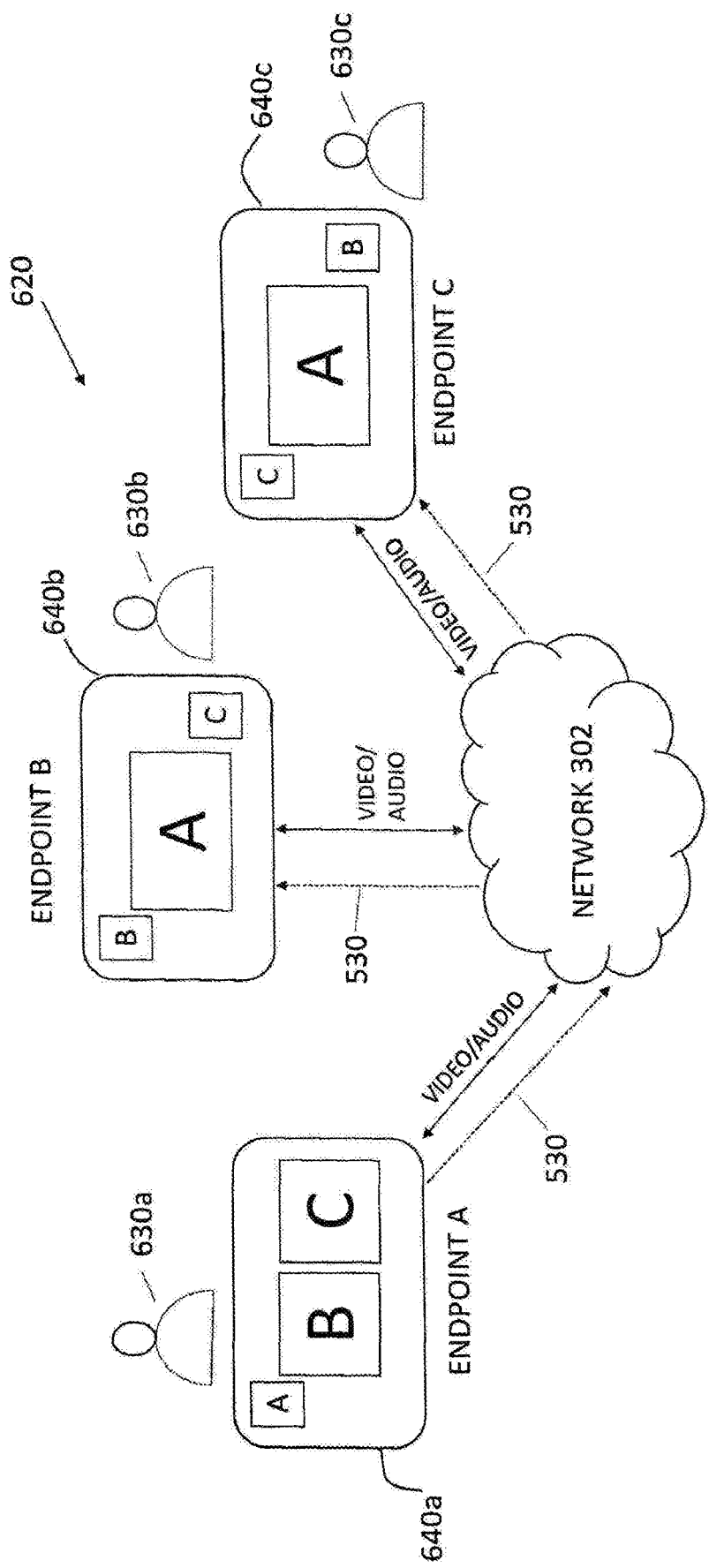

FIG. 6B illustrates a trigger notification 530 sent from Endpoint A to Endpoints B and C. In this example, Endpoint A detects two trigger conditions 510 as user 630a is detected near Endpoint A and begins speaking. Once one or both of these trigger conditions 510 meet or exceed their respective trigger threshold 520, trigger notification 530 is sent to both Endpoints B and C. Users 630b and 630c are detected by their respective Endpoints B and C, but since no trigger threshold 520 has been met or exceeded at Endpoints B or C, neither of Endpoints B or C send a trigger notification. In this example, trigger notification 530 enables audio to be sent from Endpoint A to both Endpoints B and C, but audio from Endpoints B and C will not be sent to Endpoint A until a respective endpoint sends a trigger notification 530 back to Endpoint A. Trigger notification 530 is shown being sent to network 302 via a separate signaling channel, but it could also be sent via the video/audio channel. Further, when Endpoint B receives trigger notification 530 from Endpoint A, the video display 640b located at Endpoint B displays the video feed from Endpoint A more prominently as compared to video from Endpoint C.

In another exemplary embodiment, sending trigger notification 530 from Endpoint A to Endpoint B opens a bi-directional audio feed between Endpoint A and Endpoint B.

In another exemplary embodiment, trigger notification 530 from Endpoint A opens bi-directional audio channels between each of Endpoints A-C.

Context specific trigger conditions 510 detected at an endpoint can cause additional actions other than enabling an audio feed during the videoconference session. For example, if user 630a located at Endpoint A mentions the location of Endpoint B (e.g., the San Francisco office) during a videoconference, the volume at Endpoint B will increase and the volume at any other connected endpoints will remain steady. This increase in volume at Endpoint B would provide a local notification to user 630b at Endpoint B that the current conversation pertains to their location, further enhancing the video conference experience. Further, if facial recognition is enabled at Endpoint B, where user 630b is named John Smith and is recognized by Endpoint B, the mention of John Smith's name by user 630a at Endpoint A causes trigger notification 530 to be sent through network 302 which causes a volume increase at Endpoint B to get the attention of John Smith. Other actions that can be enabled through the receipt of trigger notification 530 may be highlighting a display at Endpoint B, sounding an audible alert at Endpoint B, or some other visual or audible emphasis of the stream from the Endpoint A.

Figure 6C:
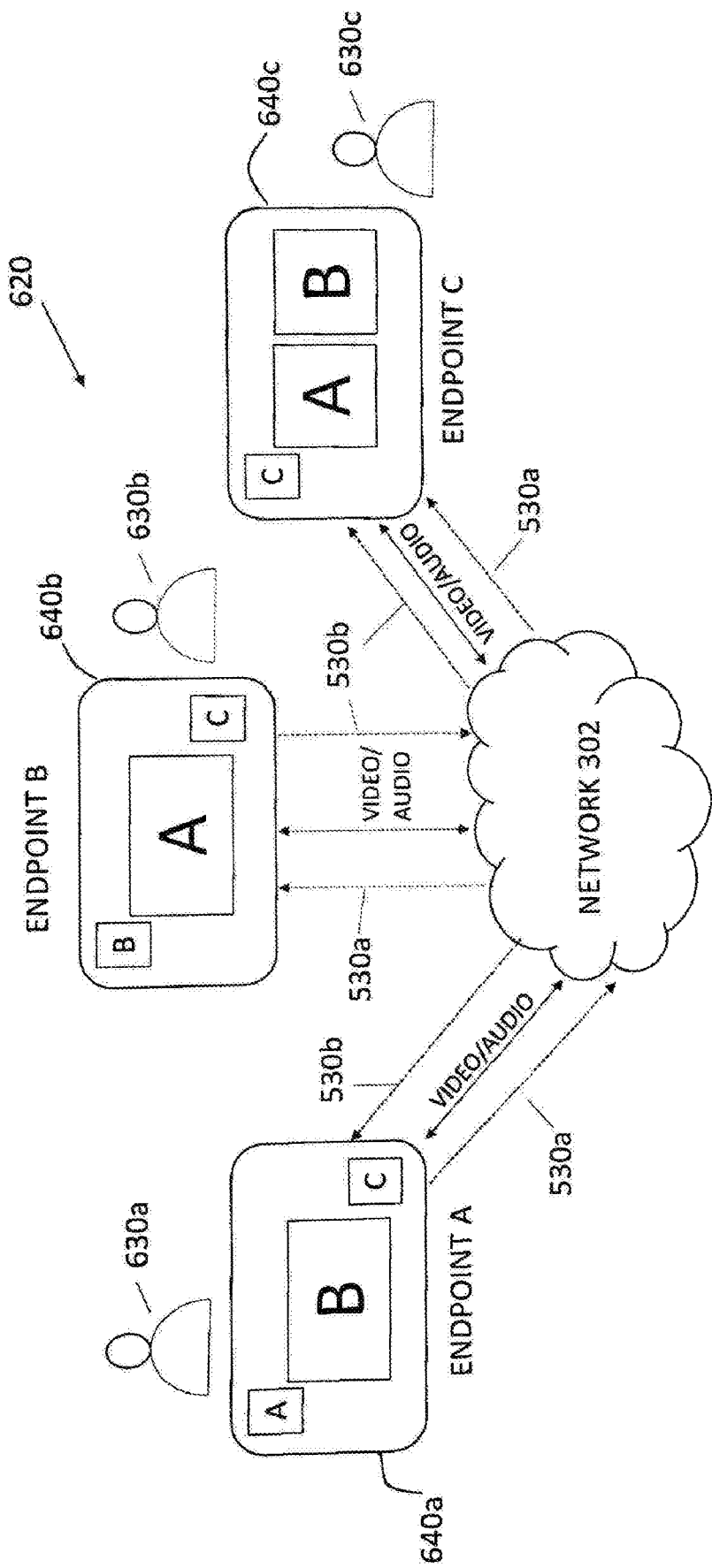

With reference to FIG. 6C, both Endpoints A and B are sending a respective trigger notification 530a, 530b to each of the other respective Endpoints A-C. Trigger notifications 530a, 530b enable the transmission of the audio feed from each of Endpoints A-C. Further, video feeds from Endpoints A and B are enlarged in each endpoint video display 640a-640c to provide a visual reference at each endpoint as to which endpoint is currently active in the videoconference.

Figure 7:
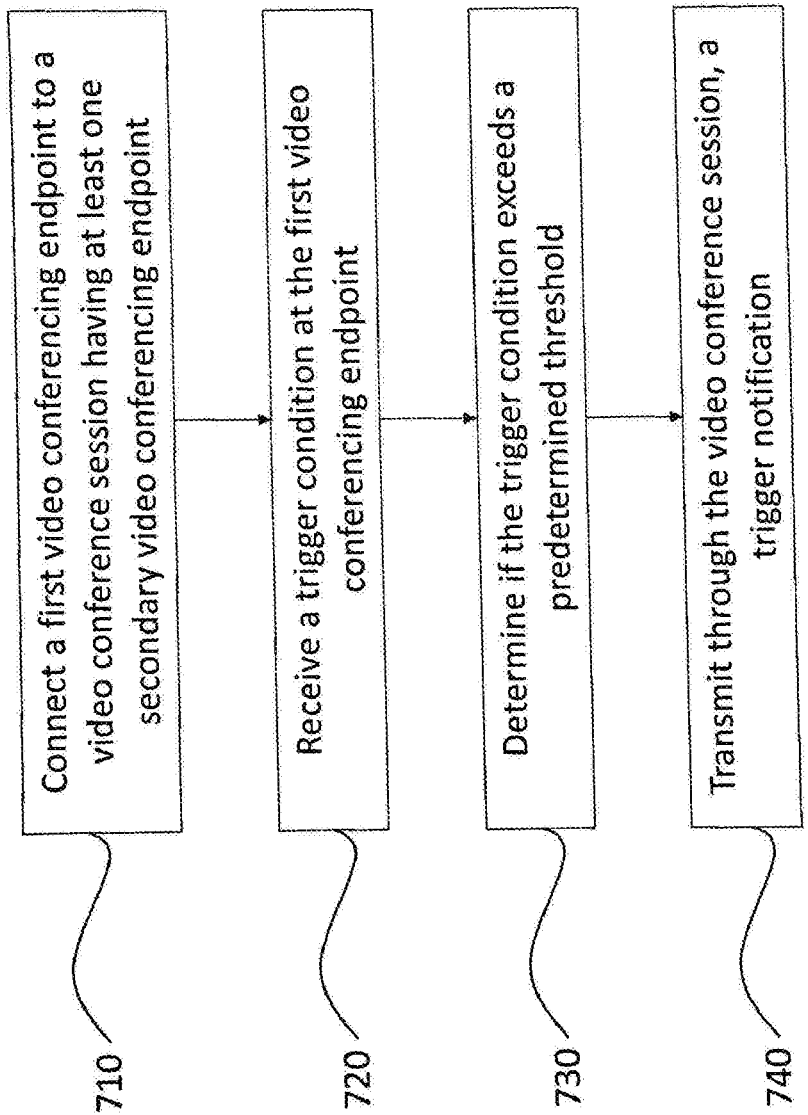
FIG. 7 shows a flow chart for an exemplary process concerning trigger states for a video conferencing system in accordance with some embodiments of the invention.

FIG. 7 is a flow chart concerning a videoconferencing endpoint detecting trigger states for a continuous presence videoconference session 620. In Step 710, a first video conferencing endpoint is connected to a video conference session 620 having at least one secondary video conference endpoint. In Step 720, the first video conferencing endpoint detects a trigger condition. In Step 730, it is determined if the trigger condition exceeds a predetermined threshold (e.g., minimum volume, user presence, facial recognition match, etc.). In Step 740, a trigger notification is transmitted to the at least one secondary video conference endpoint.

Figure 8:
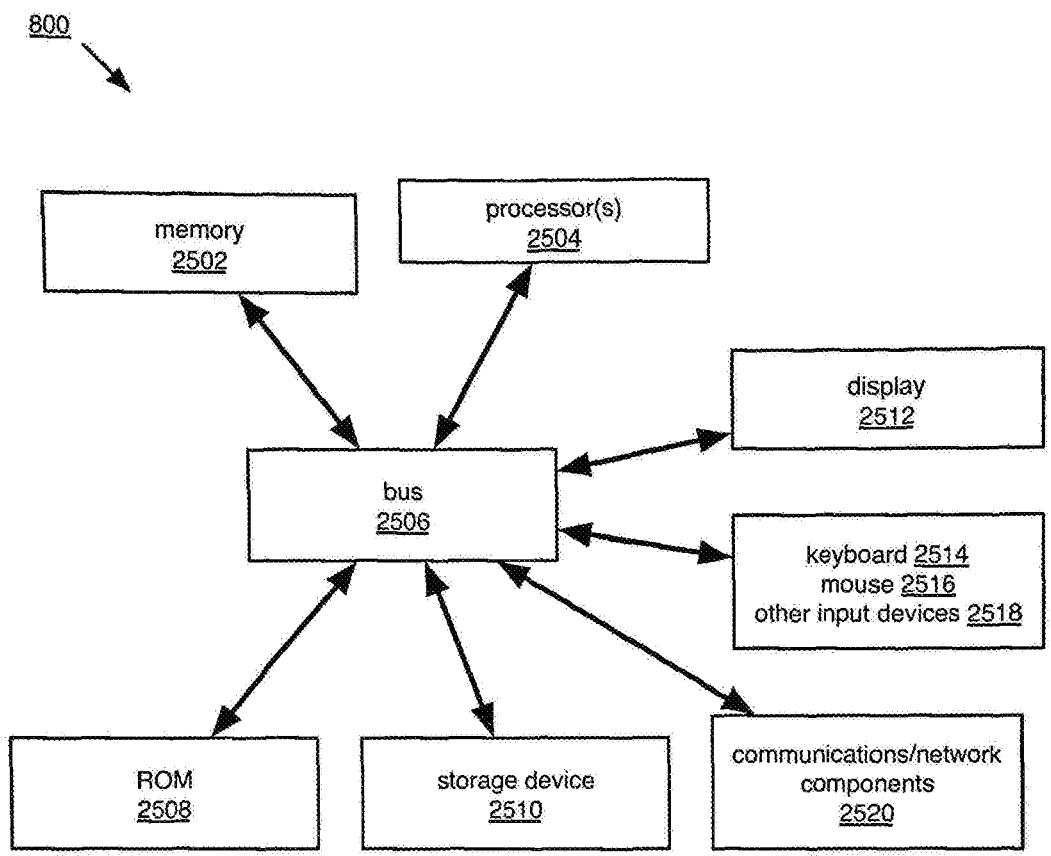
FIG. 8 shows a block diagram of an exemplary computing system in accordance with some embodiments of the invention.

FIG. 8 is a block diagram showing an exemplary computing system 800 that is representative any of the computer systems or electronic devices discussed herein. Note that not all of the various computer systems have all of the features of system 800. For example, systems may not include a display inasmuch as the display function may be provided by a client computer communicatively coupled to the computer system or a display function may be unnecessary.

System 800 includes a bus 2506 or other communication mechanism for communicating information, and a processor 2504 coupled with the bus 2506 for processing information. Computer system 800 also includes a main memory 2502, such as a random access memory or other dynamic storage device, coupled to the bus 2506 for storing information and instructions to be executed by processor 2504. Main memory 2502 also may be used for storing temporary variables or other intermediate information during execution of instructions to be executed by processor 2504.

System 800 includes a read only memory 2508 or other static storage device coupled to the bus 2506 for storing static information and instructions for the processor 2504. A storage device 2510, which may be one or more of a hard disk, flash memory-based storage medium, magnetic tape or other magnetic storage medium, a compact disc (CD)-ROM, a digital versatile disk (DVD)-ROM, or other optical storage medium, or any other storage medium from which processor 2504 can read, is provided and coupled to the bus 2506 for storing information and instructions (e.g., operating systems, applications programs and the like).

Computer system 800 may be coupled via the bus 2506 to a display 2512 for displaying information to a computer user. An input device such as keyboard 2514, mouse 2516, or other input devices 2518 may be coupled to the bus 2506 for communicating information and command selections to the processor 2504. Communications/network components 2520 may include a network adapter (e.g., Ethernet card), cellular radio, Bluetooth radio, NFC radio, GPS receiver, and antennas used by each for communicating data over various networks, such as a telecommunications network or LAN.

The processes referred to herein may be implemented by processor 2504 executing appropriate sequences of computer-readable instructions contained in main memory 2502. Such instructions may be read into main memory 2502 from another computer-readable medium, such as storage device 2510, and execution of the sequences of instructions contained in the main memory 2502 causes the processor 2504 to perform the associated actions. In alternative embodiments, hard-wired circuitry or firmware-controlled processing units (e.g., field programmable gate arrays) may be used in place of or in combination with processor 2504 and its associated computer software instructions to implement the invention. The computer-readable instructions may be rendered in any computer language including, without limitation, Python, Objective C, C#, C/C++, Java, Javascript, assembly language, markup languages (e.g., HTML, XML), and the like. In general, all of the aforementioned terms are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 800 or similar electronic computing device, that manipulates and transforms data represented as physical (electronic) quantities within its registers and memories into other data similarly represented as physical quantities within its memories or registers or other such information storage, transmission or display devices.

While the preferred embodiments have been shown and described, it will be understood that there is no intent to limit the invention by such disclosure, but rather, is intended to cover all modifications and alternate constructions falling within the spirit and scope of the invention.

What is claimed is:

1. A method, comprising:
   connecting, by a processor, a first video conferencing endpoint to a video conference session having a second video conferencing endpoint, wherein video streaming from the first video conferencing endpoint via the video conference session is enabled in a default state, wherein the default state includes muted audio and a low-bandwidth video stream;
   receiving, by the processor, a trigger condition at the first video conference endpoint;
   determining, by the processor, if the trigger condition exceeds a predetermined threshold;

responsive to a determination that the trigger condition exceeds the predetermined threshold, transmitting, by the processor, through the video conference session, a first trigger notification to the second video conferencing endpoint;

subsequent to transmission of the first trigger notification, transmitting, from the first video conferencing endpoint, video in an active state to the second video conferencing endpoint, wherein the active state includes un-muted audio and an increased-bandwidth video stream relative to the bandwidth of the default state; and in response to receiving the first trigger notification at the second video conferencing endpoint, enlarging a display, at the second video conferencing endpoint, of the video from the first video conferencing endpoint.

2. The method of claim 1, wherein the trigger condition is detection of user presence proximate to the first video conference endpoint.

3. The method of claim 1, wherein the trigger condition is facial recognition of a user proximate to the first video conference endpoint.

4. The method of claim 1, wherein the trigger condition is a combination of detection of user presence and voice activity proximate to the first video conference endpoint.

5. The method of claim 1, wherein the first trigger notification from the first videoconferencing endpoint increases an audio volume of the second videoconferencing endpoint.

6. The method of claim 1, further comprising in response to the second videoconferencing endpoint receiving the first trigger notification from the first videoconferencing endpoint and the second videoconferencing endpoint sending a second trigger notification back to the first videoconferencing endpoint, enabling bi-directional audio between the first videoconferencing endpoint and the second videoconferencing endpoint.

7. The method of claim 1, wherein the first trigger notification from the first videoconferencing endpoint enables bi-directional audio between the first videoconferencing endpoint and the second videoconferencing endpoint.

8. A system, comprising a first and second videoconferencing endpoint:

the first videoconferencing endpoint comprising:
a first processor;
a first storage device communicatively coupled to the first processor; and
instructions on the first storage device that, when executed by the first processor, cause the first processor to:
connect the first video conferencing endpoint to a video conference session having the second video conferencing endpoint, wherein video streaming from the first video conferencing endpoint via the video conference session is enabled in a default state, wherein the default state includes muted audio and a low-bandwidth video stream;
receive a trigger condition at the first video conference endpoint;
determine if the trigger condition exceeds a predetermined threshold;
responsive to a determination that the trigger condition exceeds the predetermined threshold, transmit through the video conference session, a first trigger notification to the second video conferencing endpoint; and
subsequent to transmission of the first trigger notification, transmit, from the first video conferencing endpoint, video in an active state to the second video conferencing endpoint, wherein the active state includes un-muted audio and an increased-bandwidth video stream relative to the bandwidth of the default state; and the second videoconferencing endpoint comprising:
a second processor;
a second storage device communicatively coupled to the second processor; and
instructions on the second storage device that, when executed by the second processor, cause the second processor to:
in response to receiving the first trigger notification at the second video conferencing endpoint, enlarge a display, at the second video conferencing endpoint, of the video from the first video conferencing endpoint.

9. The system of claim 8, wherein the trigger condition is detection of user presence proximate to the first video conference endpoint.

10. The system of claim 8, wherein the trigger condition is facial recognition of a user proximate to the first video conference endpoint.

11. The system of claim 8, wherein the trigger condition is a combination of detection of user presence and voice activity proximate to the first video conference endpoint.

12. The system of claim 8, wherein the first trigger notification from the first videoconferencing endpoint increases an audio volume of the second videoconferencing endpoint.

13. The system of claim 8, wherein bi-directional audio is enabled between the first videoconferencing endpoint and the second videoconferencing endpoint in response to the second videoconferencing endpoint receiving the first trigger notification from the first videoconferencing endpoint and the second videoconferencing endpoint sending a second trigger notification back to the first videoconferencing endpoint.

14. The system of claim 8, wherein the first trigger notification from the first videoconferencing endpoint enables bi-directional audio between the first videoconferencing endpoint and the second videoconferencing endpoint.

* * * * *